United States Patent
Rolette et al.

(10) Patent No.: US 10,135,785 B2
(45) Date of Patent: Nov. 20, 2018

(54) NETWORK SECURITY SYSTEM TO INTERCEPT INLINE DOMAIN NAME SYSTEM REQUESTS

(71) Applicant: Trend Micro Incorporated, Tokyo (JP)

(72) Inventors: James Rolette, Austin, TX (US); Wei Lu, Austin, TX (US); Jonathan E. Andersson, Austin, TX (US)

(73) Assignee: Trend Micro Incorporated, Tokyo (JP)

( * ) Notice: Subject to any disclaimer, the term of this patent is extended or adjusted under 35 U.S.C. 154(b) by 252 days.

(21) Appl. No.: 15/164,731

(22) Filed: May 25, 2016

(65) Prior Publication Data
US 2016/0269362 A1    Sep. 15, 2016

Related U.S. Application Data

(63) Continuation of application No. PCT/US2013/076628, filed on Dec. 19, 2013.

(51) Int. Cl.
*H04L 29/06*    (2006.01)
*H04L 29/12*    (2006.01)
*G06N 99/00*    (2010.01)

(52) U.S. Cl.
CPC ....... *H04L 63/0236* (2013.01); *G06N 99/005* (2013.01); *H04L 61/1511* (2013.01); *H04L 63/1441* (2013.01); *H04L 63/20* (2013.01); *H04L 63/101* (2013.01); *H04L 2463/144* (2013.01)

(58) Field of Classification Search
CPC ....... H04L 63/0236; H04L 9/32; G06F 15/16; G06F 17/30; G06F 11/00; G06F 21/00; G06F 12/16; G06F 12/14; G08B 23/00; G06N 99/00
USPC ............... 726/12, 22–23; 707/709, 754, 755, 707/E17.108; 709/203, 245; 713/170
See application file for complete search history.

(56) References Cited

U.S. PATENT DOCUMENTS

| | | | |
|---|---|---|---|
| 7,930,428 B2 * | 4/2011 | Drako | G06F 15/173 709/245 |
| 8,260,914 B1 | 9/2012 | Ranjan | |
| 8,832,068 B2 * | 9/2014 | Atherton | G06F 17/30864 707/709 |
| 9,325,735 B1 * | 4/2016 | Xie | H04L 63/145 |
| 2007/0033645 A1 * | 2/2007 | Jones | H04L 29/12009 726/12 |
| 2011/0145316 A1 * | 6/2011 | Ait-Ameur | H04L 29/12066 709/203 |
| 2011/0167495 A1 | 7/2011 | Antonakakis et al. | |
| 2011/0179492 A1 | 7/2011 | Markopoulou et al. | |
| 2012/0054869 A1 | 3/2012 | Yen et al. | |
| 2012/0198549 A1 | 8/2012 | Antonakakis et al. | |

\* cited by examiner

*Primary Examiner* — Thanhnga B Truong
(74) *Attorney, Agent, or Firm* — Okamoto & Benedicto LLP

(57) ABSTRACT

Example embodiments disclosed herein relate to a network security system. The network security system intercepts inline DNS requests. It is determined whether a domain name associated with one of the inline DNS requests corresponds with one or more domain names. A security action is performed based on the determination.

10 Claims, 3 Drawing Sheets

NETWORK SECURITY SYSTEM TO INTERCEPT INLINE DOMAIN NAME SYSTEM REQUESTS

CROSS-REFERENCE TO RELATED APPLICATION(S)

This application is a continuation of International Application No. PCT/US2013/076628, with an International Filing Date of Dec. 19, 2013, which is incorporated herein by reference in its entirety.

BACKGROUND

Security providers and manufacturers are challenged to deliver quality and value to consumers, for example, by providing a secure networking environment. Intrusion prevention systems can be deployed in a network to inspect content of data packets communicated through the network. When used to apply network security, packet inspection technology is employed at multiple protocol layers to identify suspicious or malicious packets. In other examples, packet inspection can also be applied in other fields. Fast flux networks can be used to attack computing environments.

BRIEF DESCRIPTION OF THE DRAWINGS

The following detailed description references the drawings, wherein.

DETAILED DESCRIPTION

Figures 1, 2:
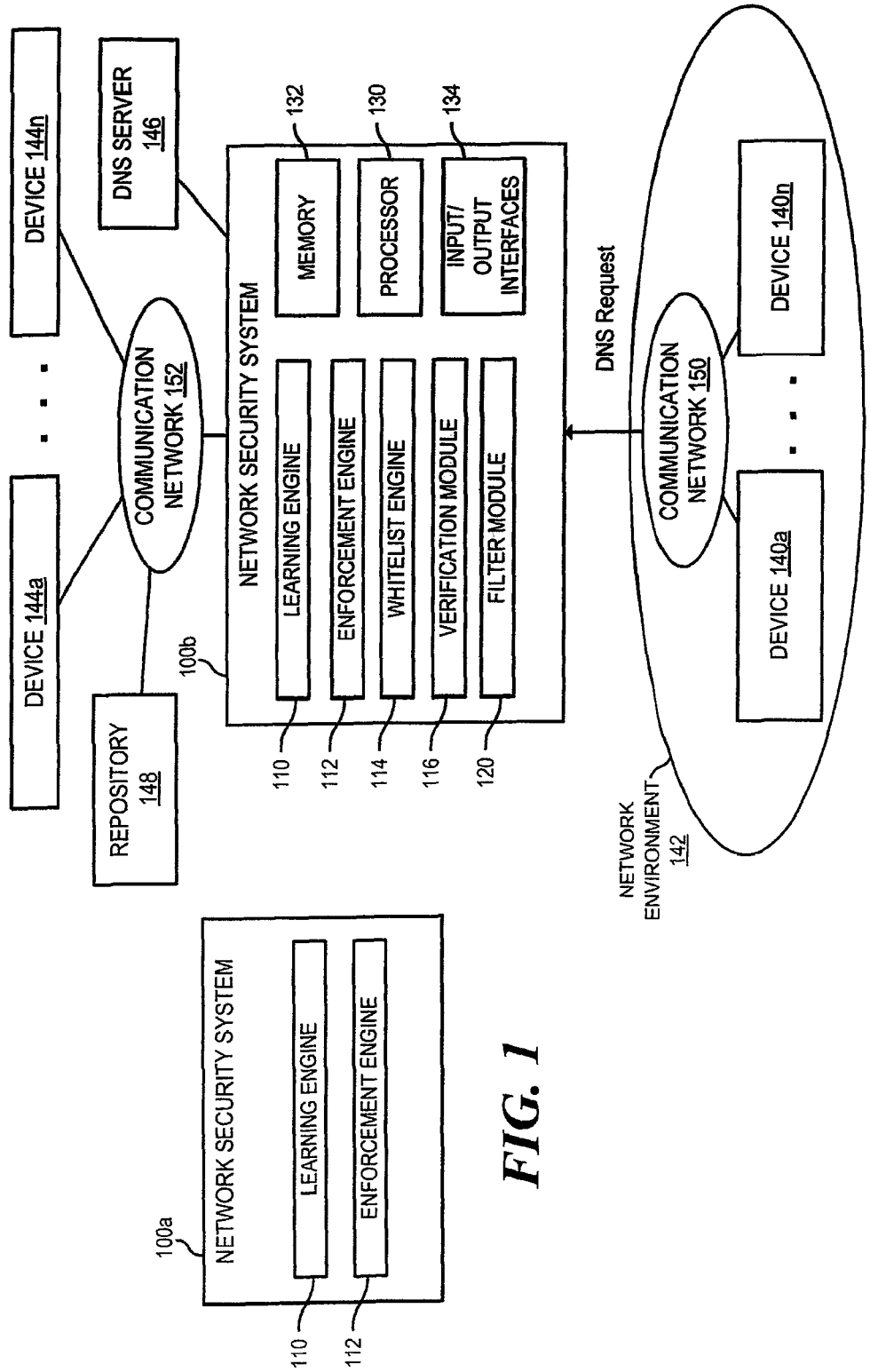
FIGS. 1 and 2 are block diagrams of a network security system, according to various examples.

Technologies can be used to protect an entity such as an individual, enterprise, etc. from unwanted malicious activity. Intrusion prevention devices can be network security appliances that can be used to monitor network and/or system activities for malicious activity. Malicious activity can include activity by botnets using fast flux networks. Fast flux is a Domain Name System (DNS) technique used by botnets to hide phishing and malware delivery sites behind a changing network including hosts acting as proxies. In fast flux networks, numerous Internet Protocol (IP) addresses are associated with a single domain name (e.g., a fully qualified domain name). The IP addresses can be swapped in and out with high frequency by changing DNS records.

As such, fast flux networks are challenging to detect and block for network security devices (e.g., firewalls, switches, routers, intrusion prevention systems, etc.) because the list of IP addresses that make up the sea of delivery sites change. Approaches for detecting fast flux networks can involve statistical analysis of a large data set captured over time, for example, how frequently DNS entries (resource records) change, extremely short lived Time-To-Live (TTL) values, number of A records returned in a DNS query, number of NS records returned in a DNS query, etc. This analysis can be time consuming.

Accordingly, various embodiments disclosed herein relate to detecting and/or blocking communication with fast flux networks in packet time in a manner suitable for an inline network security system (e.g., a network appliance). Malware can infect a computing system in a networking environment. The computing system can then be caused to call home to a command and control server on the fast flux network. This can be for various reasons, for example, to receive command and control instructions, to learn new techniques to avoid detection, to send information to a device in the fast flux network, join a distributed denial-of-service attack (DDoS attack), spam, phishing, etc. Malware using a fast flux network to provide high availability to the malware and/or to hide control structure may be limited by blocking DNS requests to a DNS server for unknown DNS names. This can limit the capabilities of the malware by limiting contact by the infected system in the network environment to the fast flux network.

The approach starts out in a learning mode. Domain names (e.g., all domain names or domain names that fit within a rule set) are tracked and/or recorded from DNS requests within a network environment. In certain examples, the network environment is a communications network that allows devices to exchange information. In certain examples, the network environment can be protected by a network security system. As such, communications going outside of the network environment pass through an inline network security system. The initial learning can be for a time frame such as 7 days, a month, etc. In some examples, the time frame can include an initial time frame and can be updated using other time frames. These domain names would be considered safe/normal because they are used by the people in the network environment at the time and the fast flux networks generally change DNS regularly.

A whitelist of DNS names that are assumed or known good can be downloaded from a repository. The repository can include a list of domain names that are well known and considered generally safe (e.g., the top 100,000, top 500,000, etc.) domains. Further, a blacklist of domain names that are considered bad or not to be used for some reason can be used to filter the domain names learned in the learning time frame. The blacklist can be received from a repository or reputation service. The whitelists and blacklists can be regularly downloaded to update what domain names are considered safe by the system.

In an enforcement mode, the system intercepts DNS requests to see if the domain name is in the whitelist or in the learned list of domains that can be considered normal use. In one example, if it is whitelisted or in the learned list, the DNS request is forwarded on to the DNS server. In another example, if the domain name in the DNS request isn't known or whitelisted, then the system can reject/block or otherwise use a negative security action on the request. Since the system has already learned "normal" domains for users on this network, an unknown domain name is inherently suspicious even if it turns out to be innocuous later.

An approach for blocked/rejected domain names to be verified and manually added to the local "assumed good" list can be provided. For example, when the request is blocked, a log can be sent to an administrator with information about the request and/or device associated with the request. The administrator can add the domain name to the local list based on an investigation and/or using other verification processes. Further, in some examples, a message can be sent to the originating device to prompt a user of the device to request addition to the local list.

With these approaches, it is possible to evaluate DNS requests in packet time (e.g., <100 microseconds) to block access to fast flux networks. This technique does not require the system to know about the DNS names used for the fast flux network a priori. As such, the approach determines that because the DNS name is new and unknown, it is suspicious. The number of domain names on the Internet is large and constantly evolving, but reputable sites are mostly static for their DNS name. The technique also does not require a large amount of memory or compute cycles required for existing statistical analysis techniques. As such, the approaches described herein are implementable within an inline network appliance.

FIGS. 1 and 2 are block diagrams of a network security system, according to various examples. Systems 100a, 100b include components that can be utilized to determine and/or perform a security action based on whether a domain name corresponds to a list of known domain names local to the system and/or to a whitelist. The respective systems 100a, 100b may be implemented as a computing device such as a security appliance, a notebook computer, a desktop computer, a server, a workstation, etc., as a network device, such as an intrusion prevention system, or any other computing device or system such as a disaggregated system that is capable of performing the functionality described herein. In certain examples, systems can include one or more device that can determine reputation and one or more other devices performing deep packet inspection.

In certain examples, the network security system can include a learning engine 110 and an enforcement engine 112. In other examples, the network security system can include a whitelist engine 114, a verification module 116, a filter module 120, processor(s) 130, memory 132, and/or input/output interfaces 134. These engines, modules, and parts can be distributed between one or more devices. In certain examples, as shown in FIG. 2, the system 100b is an inline system between one or more devices 140a-140n in a network environment 142 being protected and a device 144a-144n and/or DNS server 146.

The engines 110, 112, 114 include hardware and/or combinations of hardware and programming to perform functions provided herein. Moreover, modules (e.g., modules 116, 120) can include programming functions and/or combinations of programming functions to be executed by hardware as provided herein. When discussing the engines and modules, it is noted that functionality attributed to an engine can also be attributed to a corresponding module and vice versa. Moreover, functionality attributed to a particular module and/or engine may also be implemented using another module and/or engine.

The network security system 100 can include a learning engine 110 to record domain names from DNS requests within a network environment 142. The learning can occur during a predetermined time frame (e.g., a week). The timeframe can be customizable. The collecting of the domain names can help determine what domain names are used by entities within the network environment 142. The domain names seen during the timeframe can later be used when the enforcement engine is active.

In some examples, a counter can be used to count a number of times the domain names are used during the time frame. The filter module 120 can filter the domain names based on the count (e.g., a threshold number of requests to a domain name may be seen to allow access, etc.). Other filtering rules can be used as well.

The filter module 120 can also filter the domain names based on a reputation source, such as a repository of blacklists or a service provided to the network security system 100. In some examples, the blacklists can be determined and/or maintained by the network security system 100 and/or another network security system. As such, blacklisted or sites with a reputation for malware can be filtered from the domain name set of locally used domain names. Blacklists can be downloaded from one or more repositories and can be updated to filter additional domain names. In some examples, the domain names can be added to a local list of used domain names. As noted, the list can be filtered (e.g., the blacklist filter, filtering based on counts, etc.).

An enforcement engine 112 can be used to intercept inline DNS requests from devices 140a-140n in the network environment 142. As noted, in certain examples, the network environment is a communications network that allows devices to exchange information. In certain examples, the network environment 142 can be protected by the network security system 100. As such, the enforcement engine 112 can be placed inline between one or more of the devices 140 and the DNS server 146 and/or other devices 144 (e.g., a device associated with a fast flux network). In some examples, the DNS server 146 may be connected to the network security system via a communication network 152 (not shown). A DNS server or DNS name server is a computing device that stores the DNS records for a domain name, such as address records, name server (NS) records, mail exchanger records, etc. The DNS name server responds to queries against its database with answers (e.g., IP addresses). Some DNS servers can be considered authoritative name servers that have been configured from an original source. In some examples, communications from the network environment 142 go through the network security system to reach other networking environments (e.g., the World Wide Web).

The enforcement engine 112 can determine whether a domain name associated with the inline DNS requests corresponds with one of the recorded domain names in the list. In some examples, the list is further augmented by a whitelist. The whitelist(s) can represent assumed good domain names. Whitelists can be commercial or non-commercial and can include domain names associated with good activity and/or not known for bad activity/malware. In some examples, the whitelists can include a certain number of known good domain names.

A whitelist engine 114 can download a whitelist from a repository 148. The repository 148 can be associated with a service and received via a communication network 152, be part of the network security system 100, or the like. Further, multiple whitelists can be downloaded and/or be created by a service and provided to the whitelist engine 114. Moreover, filter module 120 can block domain names that are on a blacklist even if it is also on a whitelist.

The enforcement engine 112 can perform a security action based on a determination of whether the domain name is associated with the list. As noted, the list can include local domain names learned, a filtered list of domain names learned, the whitelist(s), combinations thereof, etc. As such, the security action can be based on recorded domain names learned and/or the whitelist domain names. The list can also be filtered as described above while the enforcement engine 112 runs.

In one example, the security action is to forward the inline DNS request being checked to a DNS server 146 if the domain name corresponds to the list (e.g., the recorded domain names and/or the whitelist). In another example, the security action can be to reject, drop, and/or redirect the inline DNS request if the domain name does not correspond to the list. As noted above, other negative security actions can be performed on the DNS request. Examples include simulating the DNS server 146 to point to a security server to communicate with the device sending the DNS request, logging the request, passing the request to the DNS server and logging the request, passing the request to the DNS server and adding the device sending the DNS request to a list of devices in the network environment 142 that may have malware. Someone can then follow up using the logs to check on device(s). Even though a single iteration of monitoring DNS requests is provided in some examples, it is noted that DNS requests can be monitored by the enforcement engine 112 regularly and actions can be performed on multiple DNS requests.

A verification module 116 can be used to cause verification of a DNS name that may have had a negative security action associated with it. As such, the security action can further cause verification process to be performed to add the domain name to the local list of recorded domain names if the verification process is passed. Further examples of verification processes are described in method 400.

A processor 130, such as a central processing unit (CPU) or a microprocessor suitable for retrieval and execution of instructions and/or electronic circuits can be configured to perform the functionality of one or more of the engines 110, 112, 114 or modules 116, 120 described herein. Moreover, as used herein, "logic" is an alternative or additional processing resource to perform a particular action and/or function, etc., described herein, which includes hardware, e.g., various forms of transistor logic, application specific integrated circuits (ASICs), gate arrays, etc., as opposed to computer executable instructions, e.g., software firmware, etc., stored in memory and executable by a processor.

In certain scenarios, instructions and/or other information can be included in memory 132 or other memory. Input/output interfaces 134 may additionally be provided by the system 100b. For example, input devices, such as a keyboard, a sensor, a touch interface, a mouse, a microphone, etc. can be utilized to receive input from an environment surrounding the system 100b. Further, an output device, such as a display, can be utilized to present information to users (e.g., for administrator use). Examples of output devices include speakers, display devices, amplifiers, LEDs, etc. Moreover, in certain embodiments, some components can be utilized to implement functionality of other components described herein. Input/output devices such as communication devices like network communication devices or wireless devices can also be considered devices capable of using the input/output interfaces 134.

Each of the modules may include, for example, hardware devices including electronic circuitry for implementing the functionality described herein. In addition or as an alternative, each module may be implemented as a series of instructions encoded on a machine-readable storage medium of device and executable by processor 130. It should be noted that, in some embodiments, some modules are implemented as hardware devices, while other modules are implemented as executable instructions.

The communication networks 150, 152 can use wired communications, wireless communications, or combinations thereof. Further, the communication networks 150, 152 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication networks 150, 152 can be in the form of a direct network link between devices. Various communications structures and infrastructure can be utilized to implement the communication network(s).

By way of example, the devices communicate with each other and other components with access to one or more communication networks via a communication protocol or multiple protocols. A protocol can be a set of rules that defines how nodes of the communication networks interact with other nodes. Further, communications between network nodes can be implemented by exchanging discrete packets of data or sending messages. Packets can include header information associated with a protocol (e.g., information on the location of the network node(s) to contact) as well as payload information.

Figure 3:
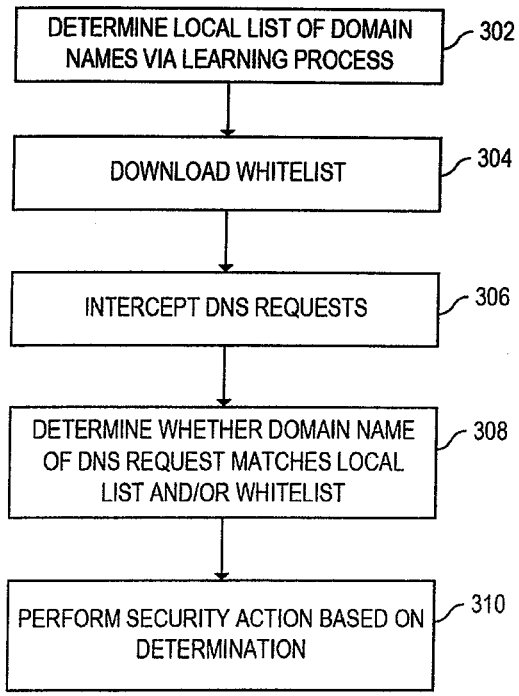
FIG. 3 is a flowchart of a method for performing a security action based on whether a domain name of a DNS request matches a local list or whitelist, according to one example.

FIG. 3 is a flowchart of a method for performing a security action based on whether a domain name of a DNS request matches a local list or whitelist, according to one example. Although execution of method 300 is described below with reference to network security system 100, other suitable components for execution of method 300 can be utilized (e.g., network security system 500). Additionally, the components for executing the method 300 may be spread among multiple devices. Method 300 may be implemented in the form of executable instructions stored on a machine-readable storage medium, such as storage medium 520, and/or in the form of electronic circuitry.

At 302, an enforcement engine can determine a local list of domains via a learning process of DNS requests within a network environment during a timeframe. The local list can be considered a baseline. The enforcement engine can determine the list by receiving it from a learning engine. In some examples, the learning engine and the enforcement engine can be part of a network security system as discussed above. For example a count of times each domain name is used during a timeframe can be kept. As noted above, a filter can be performed based on the count (e.g., keeping those at and/or above a certain threshold). Filtering can also be based on one or more reputation source (e.g., a blacklist).

At 304 a whitelist engine working with the enforcement engine can download a whitelist(s) of assumed good domain names from a repository. The whitelist(s) and the local list can be used together as a list, which may or may not be combined. For example, the list may include one or more sub lists or may be combined so that domain names are not redundant. As noted above, the list(s) can be filtered.

At 306, the enforcement engine working at a network security system to protect a network environment 142 can intercept inline DNS requests within the network environment 142. The enforcement engine can determine whether a domain name associated with the respective inline DNS requests corresponds to a domain name of the list (e.g., including the local list and the whitelist) (308).

Then, at 310, a security action is performed based on the determination. The security action can include rejecting and/or blocking the respective inline DNS request, forwarding the DNS request to a DNS server. The security action can also include various other actions as described above. In one example, a negative security action is performed if the domain name is not on the list. In another example, the DNS request is forwarded to the DNS server if the domain name is on the list.

Figure 4:
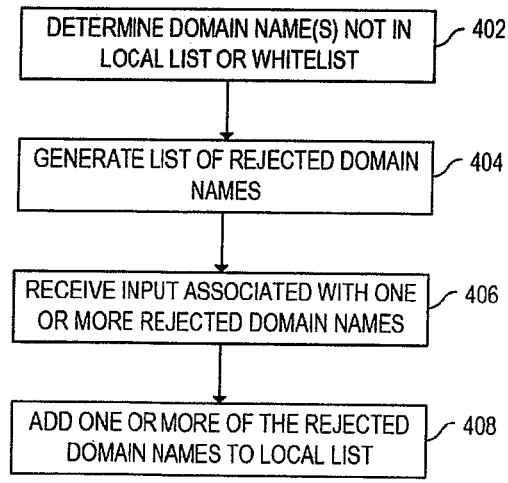
FIG. 4 is a flowchart of a method for verifying a domain name to add to a local list, according to one example.

FIG. 4 is a flowchart of a method for verifying a domain name to add to a local list, according to one example.

Although execution of method 400 is described below with reference to network security system 100, other suitable components for execution of method 400 can be utilized (e.g., network security system 500). Additionally, the components for executing the method 400 may be spread among multiple devices. Method 400 may be implemented in the form of executable instructions stored on a machine-readable storage medium, such as storage medium 520, and/or in the form of electronic circuitry.

At 402, a verification module 116 can determine domain names not in a list (e.g., local lists, whitelists, combinations thereof, etc.). This can be based on information received from an enforcement engine (e.g., as part of a security action) (404). A list can be generated of rejected domain names by the verification module 116. This can be based on a user input and/or automatic when a negative action is taken on a DNS request.

The list can be provided to a network administrator or other entity (e.g. via a log, email, request, prompt, etc.). The administrator or entity can provide input. The verification module 116 can receive the input associated with one or more of the rejected domain name(s) at 406. The input can be associated with a request to add the domain name(s) to the local list. As such, at 408, one or more of the rejected domain names are added to the local list. The enforcement engine can then use the updated local list when processing DNS requests.

Figure 5:
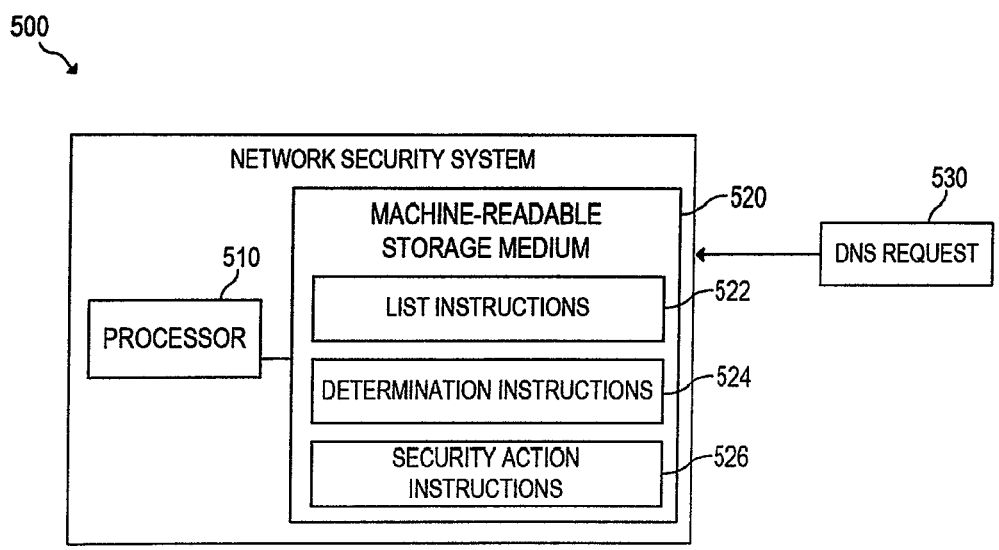
FIG. 5 is a block diagram of a network security system capable of performing a security action based on domain name learning, according to one example.

FIG. 5 is a block diagram of a network security system capable of performing a security action based on domain name learning, according to one example. The network security system 500 includes, for example, a processor 510, and a machine-readable storage medium 520 including instructions 522, 524, 526 for enforcing DNS request security. The network security system 500 may be, for example, a server, a security appliance, or any other computing device capable of providing the functionality described herein.

Processor 510 may be, at least one central processing unit (CPU), at least one semiconductor-based microprocessor, at least one graphics processing unit (GPU), other hardware devices suitable for retrieval and execution of instructions stored in machine-readable storage medium 520, or combinations thereof. For example, the processor 510 may include multiple cores on a chip, include multiple cores across multiple chips, multiple cores across multiple devices (e.g., if the computing device 500 includes multiple node devices), or combinations thereof. Processor 510 may fetch, decode, and execute instructions 522, 524, 526 to implement DNS security (e.g., via methods 300 and/or 400). As an alternative or in addition to retrieving and executing instructions, processor 510 may include at least one integrated circuit (IC), other control logic, other electronic circuits, or combinations thereof that include a number of electronic components for performing the functionality of instructions 522, 524, 526.

Machine-readable storage medium 520 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 520 may be encoded with a series of executable instructions for providing network security.

The network security system 500 can execute list instructions 522 to keep, determine, and/or maintain a list that includes a recorded domain names via a learning process and/or one or more white lists of assumed good domain names. The list can be retrieved from a learning engine and/or be used to learn the list. Further, the list instructions 522 can cause the network security system to update the list, for example, by downloading whitelists and/or blacklists for filtering, and/or going through a verification process to add a domain name to the list of domain names via a verification process. In some examples, blacklist filtering can mean that the list is filtered using a reputation source filter. In further examples, the verification process can be passed if an input is received that the domain name is acceptable or based on further lookup and comparison (e.g., downloading one or more other whitelists to compare).

During enforcement, determination instructions 524 can be executed to intercept inline DNS requests 530 within a network environment from at least one device in the environment. The network security system can determine whether a domain name associated with one of the inline DNS requests corresponds to the list (e.g., a local list (filtered or unfiltered) and whitelist(s)). The list can be in the form of one or more data structures, such as a linked list, one or more tables, one or more arrays, etc.

Once the determination is made, the security action instructions 526 can be executed to enforce a security policy and perform an action based on the determination. As noted above, in certain examples, if the domain name of the DNS request corresponds to one of the domain names on the list, the request is forwarded to the DNS server and/or no additional action is needed. In other examples, if the domain name is not on the list, the DNS request can be rejected, dropped, or redirected.

What is claimed is:

1. A network security system comprising:
a learning engine to record domain names from Domain Name System (DNS) requests within a network environment, wherein the learning engine records the domain names during a predetermined time frame;
a counter to count a number of times a plurality of respective domain names have been used during the predetermined time frame;
a filter module to filter the respective domain names based on a reputation source and the respective number of times the plurality of respective domain names have been used during the predetermined time frame to yield a filtered domain name subset, wherein the recorded domain names are based on the filtered domain name subset; and
an enforcement engine to:
intercept inline DNS requests;
determine whether a domain name associated with one of the inline DNS requests corresponds with one of the recorded domain names; and
perform a security action based on the determination.

2. The network security system of claim 1, further comprising: a whitelist engine to download a whitelist of assumed good domain names from a repository, wherein the security action is further based on the whitelist.

3. The network security system of claim 2, wherein the security action is to forward the one inline DNS request to a DNS server if the domain name corresponds to at least one of the recorded domain names and the whitelist.

4. The network security system of claim 2, wherein the security action is to at least one of rejecting, dropping, redirecting the one inline DNS request if the domain name does not correspond to at least one of the recorded domain names and the whitelist.

5. The network security system of claim 4, further comprising: a verification module, wherein the security action further causes the verification module to perform a verification process to add the domain name to the recorded domain names if the verification process is passed.

6. The network security system of claim 1, wherein the enforcement engine is placed inline between a device in the network environment from which the DNS request originates and a DNS server.

7. A non-transitory machine-readable storage medium storing instructions that, when executed by at least one processor of a network security system, cause the network security system to:
   record domain names from Domain Name System (DNS) requests within a network environment during a predetermined time frame;
   count a number of times a plurality of respective domain names have been used during the predetermined time frame;
   filter the respective domain names based on a reputation source and the respective number of times the respective plurality of domain names have been used during the predetermined time frame;
   intercept inline Domain Name System (DNS) requests within a network environment from at least one device in the network;
   determine whether a domain name associated with one of the inline DNS requests corresponds to a list that includes the recorded domain names and a whitelist of assumed good domain names; and perform a security action based on the determination.

8. The non-transitory machine-readable storage medium of claim 7, further comprising instructions that, when executed by the at least one processor, cause the network security system to: reject, drop, or redirect the one inline DNS request if the domain name does not correspond to the list.

9. The non-transitory machine-readable storage medium of claim 7, further comprising instructions that, when executed by the at least one processor, cause the network security system to: cause a verification process to add the domain name to the recorded domain names if the verification process is passed.

10. A method comprising:
   determining a local list of domain names via a learning process of Domain Name System (DNS) requests within a network environment during a timeframe;
   downloading a whitelist of assumed good domain names from a repository; intercepting, at a network security system, inline DNS requests within the network environment;
   determining whether a domain name associated with one of the inline DNS requests corresponds to a domain name of a list that includes the local list and the whitelist; and
   performing a security action based on the determination, wherein the security action is selected from group that includes: reject the one inline DNS request and forwarding the DNS request to a DNS server,
   wherein the security action includes rejecting the one inline DNS request if the domain name associated with the one inline DNS request does not correspond to the domain name of the list,
   wherein the learning process further comprises: tracking a respective count of times each used domain name is requested during the timeframe; filtering based on a reputation source and the respective counts to yield a filtered domain name subset, wherein the local list is based on the filtered domain name subset.

* * * * *